(12) United States Patent  
Justiss et al.

(10) Patent No.: US 7,975,124 B2  
(45) Date of Patent: *Jul. 5, 2011

(54) SYSTEM AND METHOD FOR DISTRIBUTED PARTITIONED LIBRARY MAPPING

(75) Inventors: Steven A. Justiss, Lakeway, TX (US); Linlin Gao, Cedar Park, TX (US); John F. Tyndall, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,066

(22) Filed: Apr. 16, 2010

(65) Prior Publication Data

US 2010/0199061 A1    Aug. 5, 2010

Related U.S. Application Data

(63) Continuation of application No. 12/237,969, filed on Sep. 25, 2008, now Pat. No. 7,752,416, which is a continuation of application No. 10/880,162, filed on Jun. 29, 2004, now Pat. No. 7,454,565.

(51) Int. Cl.  
*G06F 13/00* (2006.01)

(52) U.S. Cl. ........................ 711/173; 711/161

(58) Field of Classification Search .................. 711/161, 711/173  
See application file for complete search history.

(56) References Cited

U.S. PATENT DOCUMENTS

| | | |
|---|---|---|
| 4,104,718 A | 8/1978 | Poublan et al. |
| 4,430,701 A | 2/1984 | Christian et al. |
| 4,945,428 A | 7/1990 | Waldo |
| 5,214,768 A | 5/1993 | Martin et al. |
| 5,455,926 A | 10/1995 | Keele et al. |
| 5,506,986 A | 4/1996 | Healy |
| 5,546,315 A | 8/1996 | Kleinschnitz |
| 5,546,557 A | 8/1996 | Allen et al. |
| 5,548,521 A | 8/1996 | Krayer et al. |
| 5,568,629 A | 10/1996 | Gentry et al. |
| 5,592,638 A | 1/1997 | Onodera |
| 5,598,385 A | 1/1997 | Mizukami et al. |
| 5,612,934 A | 3/1997 | Dang et al. |

(Continued)

FOREIGN PATENT DOCUMENTS

EP    1 156 408 A1    11/2001

(Continued)

OTHER PUBLICATIONS

Office Action issued in U.S. Appl. No. 12/795,497, mailed Aug. 31, 2010, 5 pgs.

(Continued)

*Primary Examiner* — Jared I Rutz  
(74) *Attorney, Agent, or Firm* — Sprinkle IP Law Group

(57) ABSTRACT

A system and method of media library access that utilizes distributed mapping of media library partitions. A first controller can be connected to a data transport element of a media library and a second controller can be connected to a media changer of the media library. The first controller can maintain a media library partition representing a portion of the media library, receive a command from a host application based on the media library partition and forward the command to the second controller. The first controller can further translate logical addresses referenced in the command to physical addresses before forwarding the command to the second controller. The second controller can receive the command from the first controller and forward the command to the media changer. The second controller can also prioritize the command on using a FIFO or other prioritization scheme.

20 Claims, 5 Drawing Sheets

U.S. PATENT DOCUMENTS

| | | | |
|---|---|---|---|
| 5,740,061 A | 4/1998 | Dewey et al. |
| 5,761,503 A | 6/1998 | Fisher |
| 5,764,615 A | 6/1998 | Ware et al. |
| 5,790,852 A | 8/1998 | Salm |
| 5,870,732 A | 2/1999 | Fisher et al. |
| 5,892,633 A | 4/1999 | Ayres et al. |
| 5,914,919 A | 6/1999 | Fosler et al. |
| 5,925,119 A | 7/1999 | Maroney |
| 5,956,301 A | 9/1999 | Dimitri et al. |
| 5,959,866 A | 9/1999 | Hanaoka et al. |
| 5,963,971 A | 10/1999 | Fosler et al. |
| 5,971,281 A | 10/1999 | Frary et al. |
| 6,018,760 A | 1/2000 | Oishi et al. |
| 6,031,798 A | 2/2000 | James et al. |
| 6,038,490 A | 3/2000 | Dimitri et al. |
| 6,041,329 A | 3/2000 | Kishi |
| 6,041,381 A | 3/2000 | Hoese |
| 6,044,442 A | 3/2000 | Jesionowski |
| 6,052,341 A | 4/2000 | Bingham et al. |
| 6,058,494 A | 5/2000 | Gold et al. |
| 6,085,123 A | 7/2000 | Baca et al. |
| 6,185,165 B1 | 2/2001 | Jesionowski et al. |
| 6,327,519 B1 | 12/2001 | Ostwald et al. |
| 6,327,594 B1 | 12/2001 | Van Huben et al. |
| 6,328,766 B1 | 12/2001 | Long |
| 6,336,172 B1 | 1/2002 | Day, III et al. |
| 6,356,803 B1 | 3/2002 | Goodman et al. |
| 6,360,232 B1 | 3/2002 | Brewer et al. |
| 6,374,241 B1 | 4/2002 | Lamburt et al. |
| 6,385,706 B1 | 5/2002 | Ofek et al. |
| 6,425,035 B2 | 7/2002 | Hoese et al. |
| 6,425,059 B1 | 7/2002 | Basham et al. |
| 6,480,934 B1 | 11/2002 | Hino et al. |
| 6,487,561 B1 | 11/2002 | Ofek et al. |
| 6,493,721 B1 | 12/2002 | Getchius et al. |
| 6,507,883 B1 | 1/2003 | Bello et al. |
| 6,507,889 B1 | 1/2003 | Tsurumaki et al. |
| 6,574,641 B1 | 6/2003 | Dawson et al. |
| 6,604,165 B1 | 8/2003 | Terao |
| 6,665,786 B2 | 12/2003 | McMichael et al. |
| 6,675,260 B2 | 1/2004 | Torrey et al. |
| 6,715,031 B2 | 3/2004 | Camble et al. |
| 6,725,352 B2 | 4/2004 | Goodman et al. |
| 6,725,394 B1 | 4/2004 | Bolt |
| 6,738,885 B1 | 5/2004 | Zhang et al. |
| 6,763,419 B2 | 7/2004 | Hoese et al. |
| 6,772,231 B2 | 8/2004 | Reuter et al. |
| 6,804,753 B1 | 10/2004 | Moody, II et al. |
| 6,823,401 B2 | 11/2004 | Feather, Jr. et al. |
| 6,839,824 B2 | 1/2005 | Camble et al. |
| 6,845,431 B2 | 1/2005 | Camble et al. |
| 6,950,723 B2 | 9/2005 | Gallo et al. |
| 7,136,988 B2 | 11/2006 | Gallo |
| 7,146,244 B2 | 12/2006 | Byers et al. |
| 7,199,809 B1 | 4/2007 | Lacy et al. |
| 7,200,546 B1 | 4/2007 | Nourmohamadian et al. |
| 7,370,173 B2 | 5/2008 | Justiss et al. |
| 7,428,613 B1 | 9/2008 | Justiss et al. |
| 7,451,291 B2 | 11/2008 | Justiss et al. |
| 7,454,565 B1 | 11/2008 | Justiss et al. |
| 7,505,980 B2 | 3/2009 | Tyndall et al. |
| 7,752,384 B2 | 7/2010 | Moody, II et al. |
| 7,752,416 B2 | 7/2010 | Justiss et al. |
| 7,788,413 B1 | 8/2010 | Justiss et al. |
| 2001/0020197 A1 | 9/2001 | Nakano et al. |
| 2002/0004883 A1 | 1/2002 | Nguyen et al. |
| 2002/0019863 A1 | 2/2002 | Reuter et al. |
| 2002/0144048 A1 | 10/2002 | Bolt |
| 2002/0169521 A1 | 11/2002 | Goodman et al. |
| 2002/0188592 A1 | 12/2002 | Leonhardt et al. |
| 2002/0199077 A1 | 12/2002 | Goodman et al. |
| 2003/0014585 A1 | 1/2003 | Ji |
| 2003/0070053 A1 | 4/2003 | Gallo et al. |
| 2003/0084240 A1 | 5/2003 | Torrey et al. |
| 2003/0126360 A1 | 7/2003 | Camble et al. |
| 2003/0126361 A1 | 7/2003 | Slater et al. |
| 2003/0126362 A1 | 7/2003 | Camble et al. |
| 2003/0126395 A1 | 7/2003 | Camble et al. |
| 2003/0126396 A1 | 7/2003 | Camble et al. |
| 2003/0126460 A1 | 7/2003 | Camble et al. |
| 2003/0131157 A1 | 7/2003 | Hoese et al. |
| 2003/0131253 A1 | 7/2003 | Martin et al. |
| 2003/0135580 A1 | 7/2003 | Camble et al. |
| 2003/0212873 A1 | 11/2003 | Lee et al. |
| 2003/0221054 A1 | 11/2003 | Wu |
| 2004/0044828 A1 | 3/2004 | Gibble et al. |
| 2004/0044871 A1 | 3/2004 | Weber et al. |
| 2004/0054838 A1 | 3/2004 | Hoese et al. |
| 2004/0064641 A1 | 4/2004 | Kodama |
| 2004/0088513 A1 | 5/2004 | Biessener et al. |
| 2004/0107300 A1 | 6/2004 | Padmanabhan et al. |
| 2004/0111580 A1 | 6/2004 | Weber et al. |
| 2004/0133915 A1 | 7/2004 | Moody, II et al. |
| 2004/0139094 A1 | 7/2004 | Tyndall et al. |
| 2004/0139195 A1 | 7/2004 | Feather, Jr. et al. |
| 2004/0139240 A1 | 7/2004 | DiCorpo et al. |
| 2004/0139260 A1 | 7/2004 | Steinmetz et al. |
| 2004/0148460 A1 | 7/2004 | Steinmetz et al. |
| 2004/0148461 A1 | 7/2004 | Steinmetz et al. |
| 2006/0069844 A1 | 3/2006 | Gallo et al. |
| 2006/0149919 A1 | 7/2006 | Arizpe et al. |
| 2006/0174071 A1 | 8/2006 | Justiss et al. |
| 2007/0162656 A1 | 7/2007 | Bryan et al. |
| 2009/0049224 A1 | 2/2009 | Justiss et al. |

FOREIGN PATENT DOCUMENTS

| | | |
|---|---|---|
| WO | WO 02/027463 A2 | 4/2002 |
| WO | WO 03/104971 A1 | 12/2003 |
| WO | WO 2004/044783 A2 | 5/2004 |
| WO | WO 2004/044784 A2 | 5/2004 |

OTHER PUBLICATIONS

Notice of Allowance issued in U.S. Appl. No. 11/046,019, mailed Jul. 29, 2010, 16 pgs.

International Search Report for PCT/US03/35822, dated Dec. 6, 2004, 7 pgs.

International Search Report for PCT/US03/35824, dated Dec. 6, 2004, 7 pgs.

Working Draft NCITS T10 Project 999D, "Information Technology—SCSI-3 Medium Changer Commands (SMC)", pp. 1-68, Mar. 4, 1998.

Working Draft INCITS T10 Project 1383D, "Information Technology—SCSI Media Changer Commands-2 (SMC-2)", pp. i-x and 1-58, Nov. 18, 2003.

Official Action issued in U.S. Appl. No. 11/046,019, mailed May 9, 2007, 12 pgs.

Office Action issued in U.S. Appl. No. 11/045,443, mailed Jun. 28, 2007, 16 pgs.

Office Action issued in U.S. Appl. No. 11/046,066, mailed Jul. 05, 2007, 18 pgs.

Office Action issued in U.S. Appl. No. 10/880,360, mailed Aug. 29, 2007, 7 pgs.

Office Action issued in U.S. Appl. No. 11/046,019, mailed Jan. 28, 2008, 14 pgs.

Office Action issued in U.S. Appl. No. 10/704,265, mailed Feb. 1, 2008, 16 pgs.

CNET Glossary: Terms for the techie:controller, [online] pp. 1-2, downloaded from internet www.cnet.com/4520-6029_1-6040342-1.html?tag=txt , Jul. 27, 2007.

CNET Glossary: Terms for the techie:crawler, [online] pp. 1-2, downloaded from Internet www.cnet.com/4520-6029_1-6040342-1.html?tag=txt, Jul. 27, 2007.

Griswold, "Storage Topologies", [online] pgs. 1-8, downloaded from internet www.crossroads.com/Library/CollateralDownloads.asp on Jul. 27, 2007.

SGI—OpenVault Glossary of Terms, [online] pp. 1-8, downloaded from Internet: www.sgi.com/products/software/openvault/glossary/html 1993-2007, source SGI, Jul. 27, 2007.

Tape Solutions: Router vs. Native Fibre Channel, Crossroads White Paper, pp. 1-7, Doc. Version #001, Crossroads Systems, Inc., Apr. 29, 2002.

Office Action issued in U.S. Appl. No. 10/704,265, mailed Jul. 21, 2008, 15 pgs.
Office Action issued in U.S. Appl. No. 11/046,019 mailed Jul. 23, 2008, 13 pgs.
Office Action issued in U.S. Appl. No. 11/046,019, mailed Jan. 7, 2009, 13 pgs.
Office Action issued in U.S. Appl. No. 10/703,965, mailed Mar. 24, 2009, 8 pgs.
Office Action issued in U.S. Appl. No. 11/118,167, mailed May 12, 2009, 38 pgs.
Office Action issued in U.S. Appl. No. 10/704,265 mailed May 3, 2007, 16 pgs.
Office Action issued in U.S. Appl. No. 10/704,265 mailed May 19, 2006, 18 pgs.
Office Action issued in U.S. Appl. No. 10/880,162 mailed Aug. 30, 2006, 5 pgs.
Office Action issued in U.S. Appl. No. 10/880,360 mailed Aug. 30, 2006, 5 pgs.
Office Action issued in U.S. Appl. No. 10/704,265 mailed Nov. 14, 2006, 16 pgs.
Office Action issued in U.S. Appl. No. 10/880,162 mailed Feb. 12, 2007, 6 pgs.
Office Action issued in U.S. Appl. No. 10/880,360 mailed Feb. 12, 2007, 6 pgs.
Office Action issued in U.S. Appl. No. 11/045,443, mailed Feb. 26, 2007, 13 pgs.
Office Action issued in U.S. Appl. No. 11/046,066, mailed Feb. 26, 2007, 17 pgs.
Office Action issued in U.S. Appl. No. 11/046,019, mailed Jun. 11, 2009 15 pgs.
ANSI, SCSI-2 Specification archived on Jul. 12, 2002, retrieved from http://web.archive.org/web/20020712181903/http://Idkelley.com/SCSI2/SCSI2-17. html on Jun. 9, 2009, 30 pgs.
Office Action issued in U.S. Appl. No. 11/118,167, mailed Nov. 27, 2009, 32 pgs.
Office Action issued in U.S. Appl. No. 11/046,019, mailed Dec. 14, 2009, 17 pgs.
Office Action issued in U.S. Appl. No. 12/237,969, mailed Oct. 14, 2009, 7 pgs.
Notice of Allowance for U.S. Appl. No. 12/795,497, mailed Dec. 23, 2010, 6 pgs.
Notice of Allowance for U.S. Appl. No. 12/795,497, mailed Mar. 2, 2011, 6 pgs.
Notice of Allowance for U.S. Appl. No. 11/046,019, mailed Mar. 14, 2011, 10 pgs.

SYSTEM AND METHOD FOR DISTRIBUTED PARTITIONED LIBRARY MAPPING

CROSS REFERENCE TO RELATED APPLICATIONS

This application is a continuation of, and claims a benefit of priority under 35 U.S.C. 120 of the filing date of U.S. application Ser. No. 12/237,969, entitled "SYSTEM AND METHOD FOR DISTRIBUTED PARTITIONED LIBRARY MAPPING" by Steven A. Justiss, Linlin Gao and John F. Tyndall, filed Sep. 25, 2008, now U.S. Pat. No. 7,752,416 issued Jul. 6, 2010, which in turn is a continuation of, and claims a benefit of priority under 35 U.S.C. 120 of the filing date of U.S. application Ser. No. 10/880,162, entitled "SYSTEM AND METHOD FOR DISTRIBUTED PARTITIONED LIBRARY MAPPING" by Steven A. Justiss, Linlin Gao and John F. Tyndall, filed Jun. 29, 2004, now U.S. Pat. No. 7,454,565, the entire contents of which are hereby expressly incorporated by reference for all purposes.

TECHNICAL FIELD OF THE INVENTION

Embodiments of the present invention relate to the field of data storage. More particularly, embodiments of the present invention relate to systems and methods for distributed mapping of partitioned libraries.

BACKGROUND OF THE INVENTION

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command to the robot and the robot moves the tape cartridge.

In a SCSI tape library, devices that are part of the library are typically addressed by target number and logical unit numbers ("LUN"). Thus, each drive and robot of a tape library typically has a target number and LUN. Cartridge slots, on the other hand, are addressed by element numbers that are used by the robot to locate the slots. Because the robot also places tape cartridges in the drives, each drive is also associated with an element number. If multiple tape libraries are connected to a single device (e.g., a fibre channel to SCSI router), the tape libraries may be further addressed by bus number.

Media libraries, such as tape and optical libraries, can range from small "auto loader" devices with a single media drive unit and a number of storage volumes to large libraries comprised of several dozen media drive units and hundreds, if not thousands of storage volumes. Some prior art media libraries include a single embedded controller to present the associated media library to other computers as a number of distinct smaller media libraries. These "partitioned libraries" may have some subset of the physical library's media drives, storage elements and import/export elements allocated to them, while sharing certain other physical library components such as media transport elements. Generally, the allocated elements have logical addresses assigned that must be mapped to actual physical addresses.

FIG. 1 illustrates one embodiment of a prior art media library system 100. System 100 includes multiple hosts 102a-102e connected via a storage area network (SAN) 105 and storage router 107 to media library 110. Media library 110 is typically a variation of a SCSI media changer, which generally contains at least one media changer 115 with an associated medium transport element 120 (alternatively referred to as a "robot" or "picker"), multiple storage elements 125 that can store storage volumes (e.g., tape cartridges, optical disks), and multiple data transport elements (drives) 130. Media library 110 can also have import/export elements 135. The media changer 115 is often a microprocessor based embedded controller that controls medium transport element 120. Medium transport element 120 physically moves storage volumes from one changer element to another. For example, medium transport element 120 can move a storage volume from a storage element to a data transport element in response to a "Move Medium" command.

In a partitioned library, a large, multi-storage element, multi-data transport element, multi-import/export element unit is represented to applications running on hosts (e.g., hosts 102a-102e) as a number of different smaller libraries, each with some allocated number of storage elements, some allocated number of data transport elements, and some number of allocated import/export elements. Each host may see a different media library that represents some subset of media library 110. Thus, for example, applications running on host 102a may see a different media library than other applications running on host 102a or applications running on host 102e.

Access to the physical media library, in these prior art systems is typically provided by a single device, such storage router 107. Storage router 107 can maintain the media library partitions, as for example, as set of logical to physical mappings, and present the host applications with the appropriate media library partitions. Each host application can then form commands based on the media library partition presented to it. Storage router 107 can map the commands to the appropriate physical addresses and forward the commands to media library 110.

As the rates at which tape drives and other media drives can read/write data increases, providing access through a single storage router or other controller can be insufficient because the device providing access to the media library can act as a bottleneck, slowing the amount of data that can be written to a storage medium. Therefore, a need exists for a system that can provide access to a media library through multiple controllers.

SUMMARY OF THE INVENTION

Embodiments of the present invention provide a system and method of media library access that eliminates, or at least substantially reduces, the shortcomings of prior art media library access systems and methods. More particularly, embodiments of the present invention provide systems and methods of distributed mapping of media library partitions.

According to one embodiment, the present invention can include a first controller connected to a data transport element of a media library and a second controller connected to a media changer of the media library. The first controller can maintain a media library partition representing a portion of the media library, receive a command from a host application based on the media library partition and forward the command to the second controller. The first controller can further translate logical addresses referenced in the command to physical addresses before forwarding the command to the second controller. The second controller can receive the command from the first controller and forward the command to the media changer. The second controller, according to another embodiment of the present invention, can also prioritize the command on a FIFO basis or according to other prioritization scheme known in the art.

Another embodiment of the present invention can include a plurality of storage routers. Each storage router from the plurality of storage routers can be connected to a data transport element of a media library and can be configured to maintain at least one media library partition, receive commands directed to a media changer based on the at least one media library partition, forward the command to another storage router. This embodiment of the present invention can also include an additional storage router connected to the media changer of the media library and each of the plurality of storage routers. The additional storage router can be configured to receive forwarded commands directed to the media changer from each of the plurality of storage routers and communicate the forwarded commands to the media changer.

Yet another embodiment of the present invention can include a method comprising maintaining a media library partition at a first controller, receiving a command directed to a media changer at a first controller based on the media library partition, forwarding the command from the first controller to a second controller; and forwarding the command from the second controller to the media changer. This embodiment of the present invention can further include translating logical addresses to physical addresses at the first controller and prioritizing commands at the second controller.

Yet another embodiment of the present includes a computer program device for distributed media library mapping comprising a set of software instructions stored on one or more computer readable media, wherein the software instructions are executable by one or more processors to maintain a media library partition at a first controller, receive a command based on the media library partition, wherein the command is directed to a media changer, translate logical addresses in the command to physical addresses and forward the command to a second controller.

Another embodiment of the present invention includes system comprising a media library that has a plurality of data transport elements and a media changer; a plurality of storage area networks; and a plurality of storage routers. Each of the plurality of storage routers can be connected to a storage area network from the plurality of storage area networks, a data transport element from the plurality of data transport elements and a control network. Moreover, each of the plurality of storage routers can be configured to maintain a library partition representing a portion of the media library, receive a command directed to the media changer based on the library partition via the storage area network; translate logical addresses in the command to physical addresses; and forward the command to another storage router via the control network. Additionally, the system can include an additional storage router connected to the control network and connected to the media changer. The additional storage router can be configured to receive commands via the control network from the plurality of storage routers directed to the media changer and forward the commands to the media changer on a FIFO basis.

Embodiments of the present invention provide an advantage over prior art media library partitioning systems and methods by allowing media library partitions to be used across multiple storage area networks.

Embodiments of the present invention provide yet another advantage over prior art media library partitioning system and methods by eliminating or reducing the data throughput bottlenecks caused by having only one router connected to the media library.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like and corresponding parts of the various drawings.

Embodiments of the present invention provide systems and methods of distributed mapping of a media library. Embodiments of the present invention can include multiple controllers that interface with a media library. Each controller connected to a data transport element (e.g., a drive) can maintain a library partition representing a portion of the media library. When a controller receives a command directed to a media changer based on the library partition, the controller can translate logical addresses in the command to physical addresses and forward the command to the controller that is connected to the media changer. The controller connected to the media changer can include prioritization logic to prioritize and forward commands to the media changer. It should be noted that the term "connected" means to allow data communication, including through electrical, optical opto-electrical and other connections known in the art.

Figure 1:
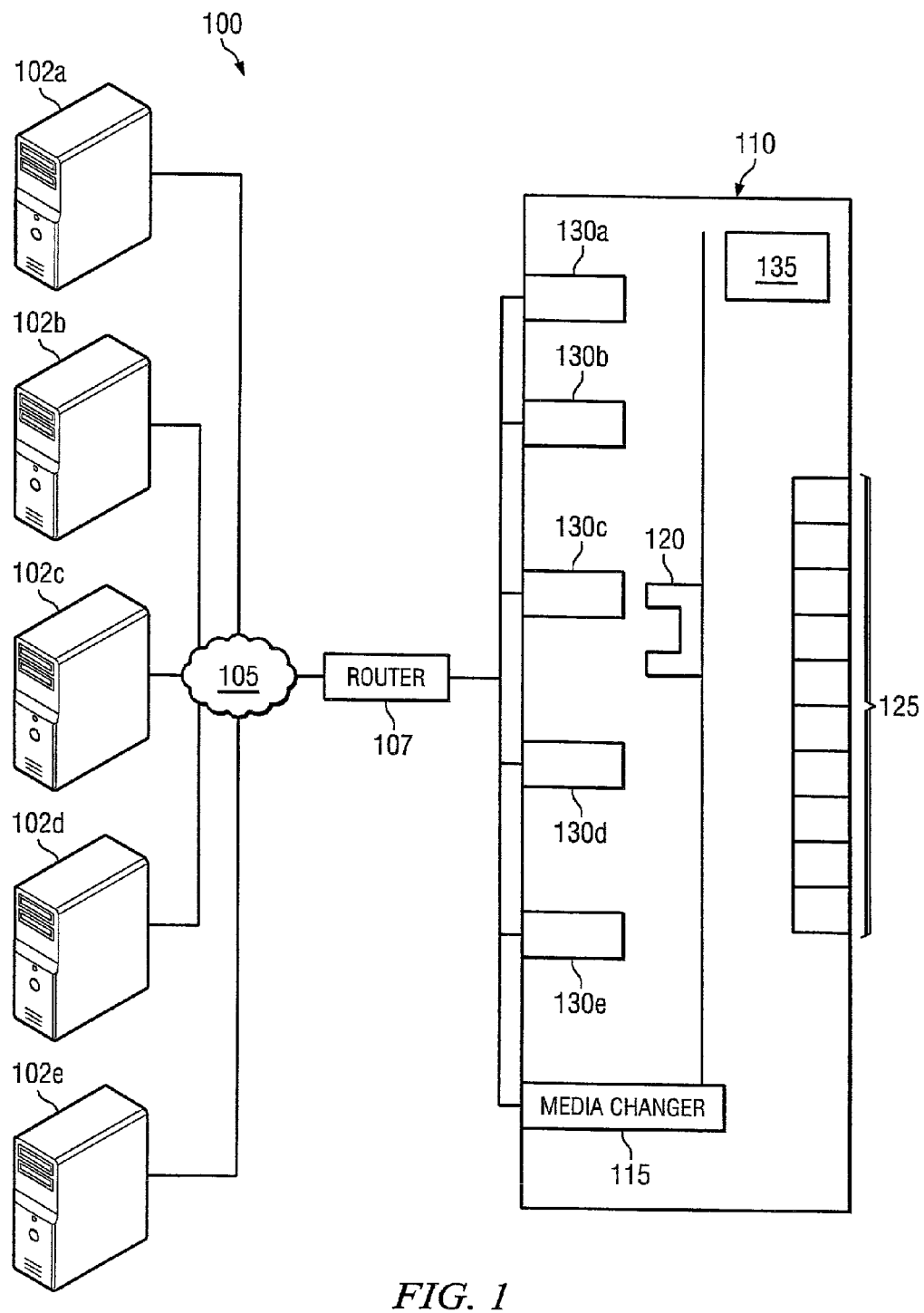
FIG. 1 is a diagrammatic representation of one embodiment of a prior art media library system.
Figure 2:
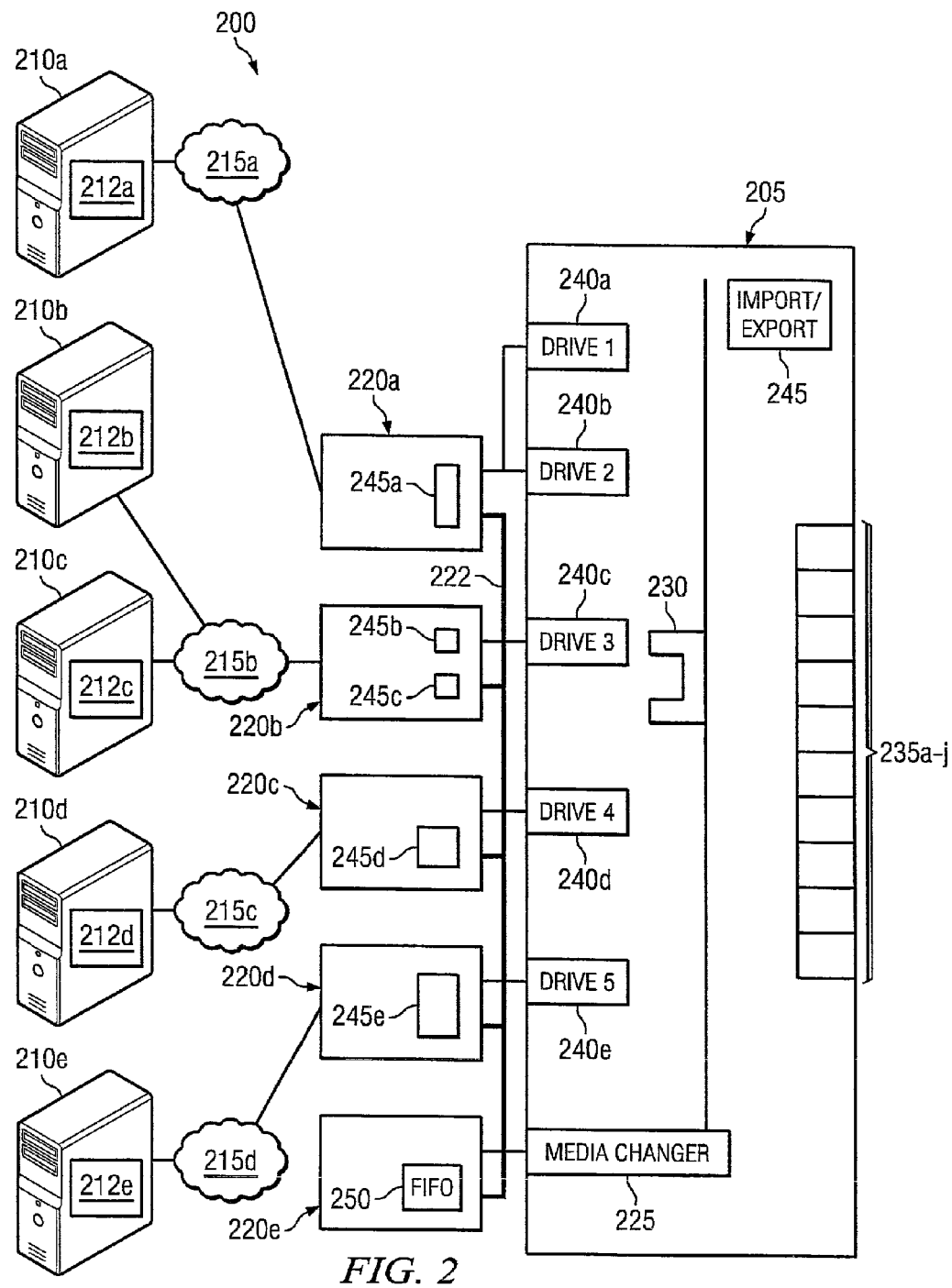
FIG. 2 is a diagrammatic representation of a system in which a number of hosts have access to a media library through various networks according to one embodiment of the present invention.

FIG. 2 is a diagrammatic representation of a system 200 in which a number of hosts have access to a media library 205 through various networks according to one embodiment of the present invention. In this embodiment, host 210a is connected to media library 205 via network 215a and controller 220a, hosts 210b and 210c are connected to media library 205 via network 215b and controller 220b, host 210d is connected to media library 205 via network 215c and controller 220c and host 210e is connected to media library 205 via network 215d and controller 220d. Each host can run one or more host applications (represented by host application 212a-e) configured to access a media library. According to one embodiment of the present invention, each network 215 can be a storage area network ("SAN"), operating according to a particular interconnect protocol, such as fibre channel, SCSI, iSCSI, serial attached SCSI ("SAS"), advanced technology attachment ("ATA"), serial advanced technology attachment ("SATA") infiniband or other interconnect protocol. In other embodiments of the present invention, each network 215 can be the Internet, a LAN, a WAN, a wireless network or any other communications network known in the art. Media library 205 can communicate with each controller 220 according protocols including, but not limited to, SCSI, iSCSI, fibre channel, SAS, ATA, SATA or other protocol known in the art. Controllers 220 can also communicate with each other via a control network 222 that can operate according any protocol known in the art.

Each controller 220 can include, for example, one or more communications interfaces to connect to media library 205 and to one or more other data transport mediums, such as a network (e.g., a SAN and/or a control network), processors and computer readable memories (RAM, ROM, magnetic disk, optical disk and/or other computer readable memory known in the art) that can store software instructions. The software instructions can be executable to control access by hosts on the respective network to media library 205.

According to one embodiment of the present invention, each controller 220 can be implemented as a storage router with software and/or hardware programming. For purposes of this application a storage router is any device that routes or manages data to and from storage devices, hosts and/or both, including, but not limited to SAN storage appliances, NAS storage appliances, RAID controllers, HBAs and other devices that can route/process storage related commands. Each storage router can be, for example, a Fibre Channel to SCSI routing device; Fibre Channel to Fibre Channel routing device; SCSI to SCSI routing device; iSCSI to iSCSI routing device; Fibre Channel to iSCSI routing device; iSCSI to Fibre Channel routing device; iSCSI to SCSI routing device; SCSI to iSCSI routing device; Fibre Channel to Infiniband routing device; Infiniband to Fibre Channel routing device; iSCSI to ATA routing device; ATA to iSCSI routing device; iSCSI to SATA routing device; Serial ATA to iSCSI routing device; Fibre Channel to Serial Attached SCSI routing device; Serial Attached SCSI to Fibre Channel routing device; iSCSI to Serial Attached SCSI routing device; Serial Attached SCSI to iSCSI routing device; Fibre Channel to ATA routing device; ATA to Fibre Channel routing device; Fibre Channel to SATA routing device; SATA to Fibre Channel routing device; Fibre Channel to Serial SCSI Architecture routing device; Serial SCSI Architecture to Fibre Channel routing device; Infiniband to Serial Attached SCSI routing device; Serial Attached SCSI to Infiniband routing device. An example of a storage router includes the Crossroads 10000 storage router, manufactured by Crossroads Systems, Inc. of Austin, Tex. Controllers 220 can communicate with each other and other devices or computers on a control network 222, such as a TCP/IP network or other network known in the art.

Media library 205 can include media changer 225 with an associated medium transport element 230 (alternatively referred to as a "robot" or "picker"), multiple storage elements 235 (in this case, storage elements 235a-j) that can store storage volumes (e.g., tape cartridges, optical disks), data transport elements (drives) 240a-e and one or more load (import/export) elements 245. The media changer 225 can control medium transport element 230. Medium transport element 230 physically moves storage volumes from one element to another. For example, medium transport element 230 can move a storage volume from a storage element to a data transport element in response to a "Move Medium" command. In the case of a tape library, this can involve moving a tape cartridge from a slot to a drive so that data can be written to the magnetic tape in the cartridge.

Media library 205 can be represented to hosts 210 as one or more partitions. When a host application searches a network for available media libraries, the controller controlling access to the media library for that host can make a media library partition available to the host application that represents a portion or all of a larger media library. In the example of FIG. 2, controller 220a can maintain library partition 245a and make it available to host 212a, controller 220b can maintain media library partition 245b, available to host application 212b and media library partition 245c, available to host application 212c, controller 220c can maintain library partition 245d, available to host application 212d, and controller 220d can maintain library partition 245e, available for host application 212e. The media library partitions can be maintained according to any media library partitioning scheme known in the art.

Each controller can present the media library partitions to the host applications as logical storage element, data transport element and media changer addresses, as would be understood by those in the art. For commands to the media changer, the controller receiving the command can map the command from the logical addresses referenced by the command to the physical addresses dictated by the appropriate library partition and forward the commands to the controller connected to the media changer (e.g., controller 220e). For commands to the data transport element, the controller receiving a command from the host can map the command to the appropriate data transport element.

Figure 3:
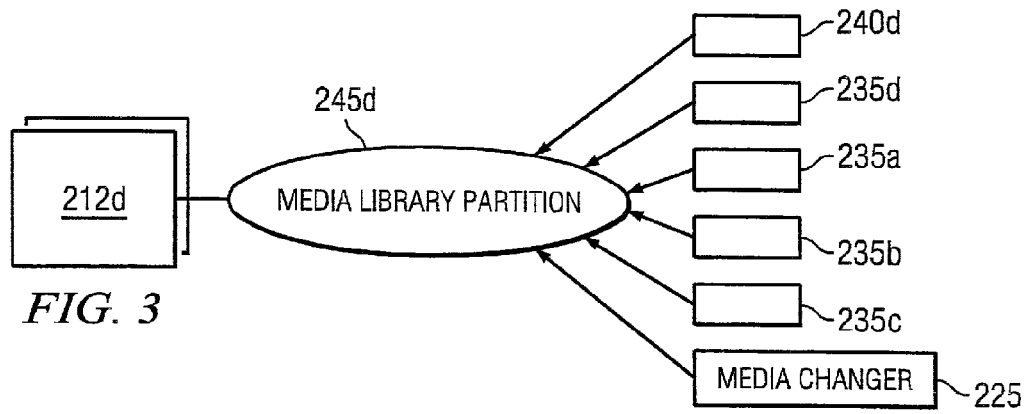
FIG. 3 is a diagrammatic representation of a physical to logical conversion for a media library partition according to one embodiment of the present invention.

Turning briefly to FIG. 3, FIG. 3 is a diagrammatic representation of an example of the physical to logical conversion for a media library partition, such as media library partition 245d made available to host application 212d, according to one embodiment of the present invention. Media library partition 245d can include storage elements 235a-c and 235d, data storage element 240d and media changer 225, and thus represents a portion of the larger media library 205 of FIG. 2. According to one embodiment of the present invention, the data storage elements associated with media library partition 245d are not available in any other partitioned media library.

Media library partition 245d can be maintained as a table of addresses. In the example in which the partitioned media library is a SCSI media library, media library partition 245d can be maintained as a table of target numbers and LUNS for physical drives and physical robots and a table of element numbers for the slots and drives of the physical media library. Table 1 is an example of a table that can be maintained to represent a partitioned media library by a controller controlling access to the physical media library.

TABLE 1

| Logical Target | Logical LUN | Logical Element | Physical Target | Physical LUN | Physical Element | Corresponding Physical Drive/ Slot/Robot |
|---|---|---|---|---|---|---|
| 1 | 3 | 1 | 1 | 2 | 3 | Drive 240d |
| 1 | 1 | | 1 | 0 | | Media Changer 225 |
| 1 | | 2 | 1 | | 4 | Storage element 235a |
| 1 | | 3 | 1 | | 5 | Storage element 235b |
| 1 | | 4 | 1 | | 6 | Storage Element 235c |
| 1 | | 5 | 1 | | 7 | Storage Element 235d |

Table 1 can include additional data, such as an associated host, a SCSI bus number or any other information used to maintain a partitioned media library as would be understood by those in the art. The data for Table 1 can be maintained as a table, multiple tables, a file, a database or in any other format known in the art. Table 1 is provided by way of example only and any addressing information sufficient to route commands to appropriate media changer can be used.

Returning to FIG. 2, if host application 212d performs discovery on network 215c to find available media libraries, controller 220c can present media library partition 245d having logical addresses for storage elements 235a-c and 235d, data transport element 240d and media changer 225. If media library 205 is a tape library, host application 212d will consequently see a tape library with one drive at LUN 3 and position 1, a media changer at LUN 1, and four cartridge slots at positions 2-5. If the host application wishes to move a cartridge from storage element 235a to drive 240d, it will issue the command to the media changer at LUN 1 to move the cartridge from storage element 2 and load it in data transport element 1. Controller 220c can, according to one embodiment of the present invention, map the command to LUN 0, storage element 4, and data transport element 3 according to Table 1 above. Controller 220c can then forward the command with the translated addresses to controller 220e for forwarding to media changer 225. Thus, commands directed to media changer 225 based on the library partition (i.e., based on the logical or physical addresses provided to the host by the controller) can have their logical addresses translated to physical addresses at controllers 220a-d. These commands can then be forwarded to controller 220e over, for example, control network 222 for further processing.

In many media libraries there is only one or a limited number of robots. Therefore a media changer (e.g., media changer 225) can not handle concurrent commands or may only handle a few concurrent commands directed to the media changer. Controller 220e, on the other hand, may receive many commands directed to media changer 225 from controllers 220a-d. Controller 220e can, therefore, prioritize commands to media changer 225. According to one embodiment of the present invention, controller 220e can maintain a FIFO buffer 250 for commands directed to media changer 225. In other embodiments of the present invention, other prioritization schemes can be employed, such as giving priority to commands from a particular other controller 220. Thus, controller 220e acts to serialize commands directed to media changer 225. It should be noted that controller 220e can also maintain one or more library partitions, translate logical addresses of received commands to physical addresses and interface with one or more data transport element.

In the example of FIG. 2, library partitions are thus distributed across multiple controllers connected to media library 205. The function of mapping logical to physical addresses is likewise distributed. Configuration of the distributed library partitions can include specifying a logical LUN for media changer 225 on each of controller 220a-220d and allocating storage elements to each library partition. The allocation of storage elements to a library partition may include designation of logical addresses for those elements. Alternatively, there may be no logical addresses at a particular controller 220, so that a host is presented with the actual physical addresses media changer 225 and the storage elements. A host can also be presented with a mix of logical and physical addresses.

Partitioning configuration can also include allocated data transport elements to each partitioned library. The designation of tape drives may include allocation of one or more tape drives connected to a particular controller 220 (e.g., by a SCSI bus or other data transport medium) or allocation of tape drives from a "virtualized pool" of tape drives. Such a "virtualized pool" of tape drives can be instantiated if the data transport interconnect between the controllers 220 and the tape drives is, for example Fibre Channel. A "pool" of drives can then be shared amongst the controllers 220 via the Fibre Channel fabric. As with storage elements, data transfer elements can be presented to hosts with logical or physical addresses. Partitioning configuration can further include, for example, allocation of import/export elements to each partitioned library. The import/export elements, as with storage and data transport elements, may or may not be assigned logical addresses.

Figure 4:
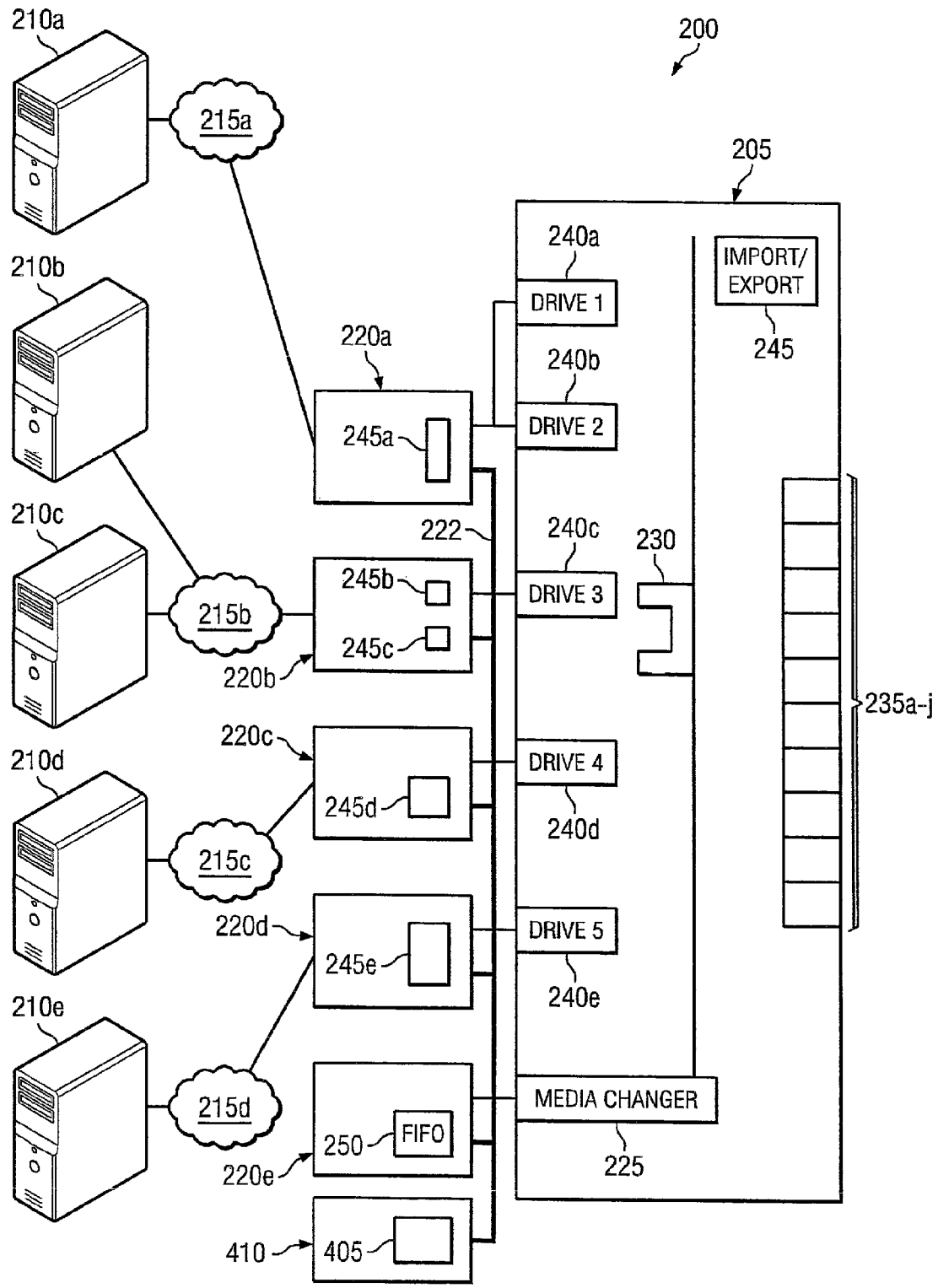
FIG. 4 is a diagrammatic representation of a system in which a number of hosts have access to a media library through various networks according to another embodiment of the present invention.

According to one embodiment of the present invention, a library administrator can configure one of the controllers 220, such as controller 220e, with the library partitions. That controller can then communicate the library partitions to the other controllers 220a-d. Alternatively, an administrator can configure each of the controllers 220 independently with the appropriate library partitions. Configuration can be performed via a graphical, control line or other interface using a library control application. In yet another embodiment of the present invention, as illustrated in FIG. 4, configuration can be performed for example using a library control application 405 residing on an administrative computer 410. The administrative computer 410 can be connected to controllers 220a-e via control network 222.

Figure 5:
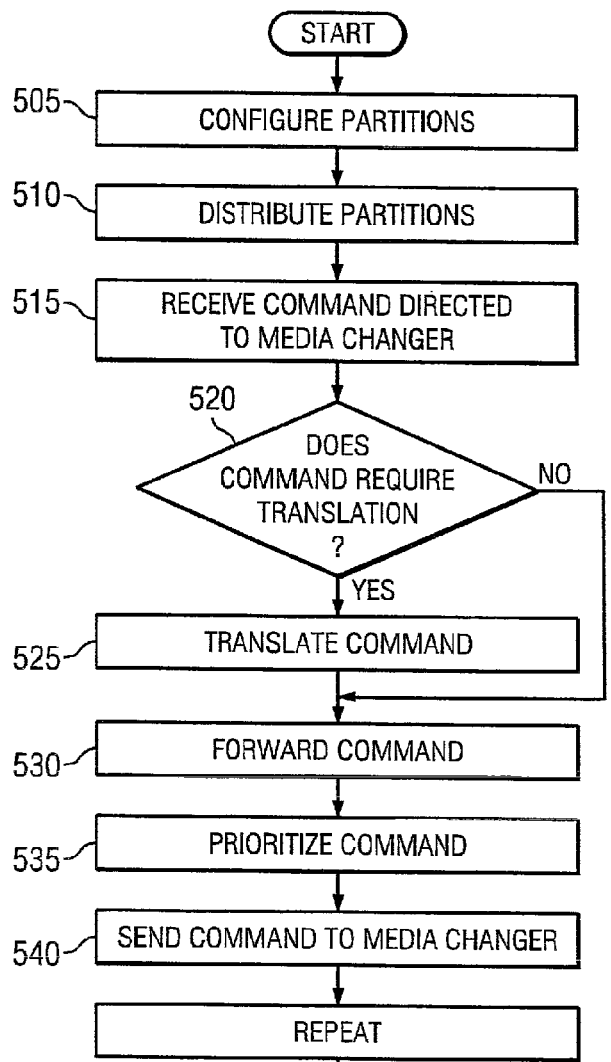
FIG. 5 is a flow chart for a method for distributed partitioned library mapping according to one embodiment of the present invention.

FIG. 5 is a flow chart illustrating a method for distributed partitioned library mapping according to one embodiment of the present invention. The process of FIG. 5 can be performed, in one embodiment of the present invention, through execution of computer instructions. The computer instructions can be distributed across computer readable media and can be executed by one or more processors. According to one embodiment of the present invention partitioning configuration can be performed at step 505. Configuration of partitions can include providing logical to physical mappings for the media changer, storage elements, import/export elements and data transport elements. The partitions, at step 510, can be distributed to the appropriate controllers via, for example, a network connection. Alternatively, configuration can occur on a controller-by-controller basis.

At step 515, a controller can receive a command directed to a media changer. If the command requires translation (i.e., if the command references logical addresses from the library partition) as determined at step 520, the controller, at step 525, can translate the logical addresses in the command to physical addresses. At step 530, the controller can forward the command to a second controller responsible for sending commands to the media changer. The second controller, at step 535, can prioritize the command according to any prioritization scheme known in the art (e.g., FIFO, LIFO or other arbitrarily defined prioritization scheme). The second controller, at step 540, can forward the command to the media changer. The process of FIG. 5 can be arbitrarily repeated.

Figure 6:
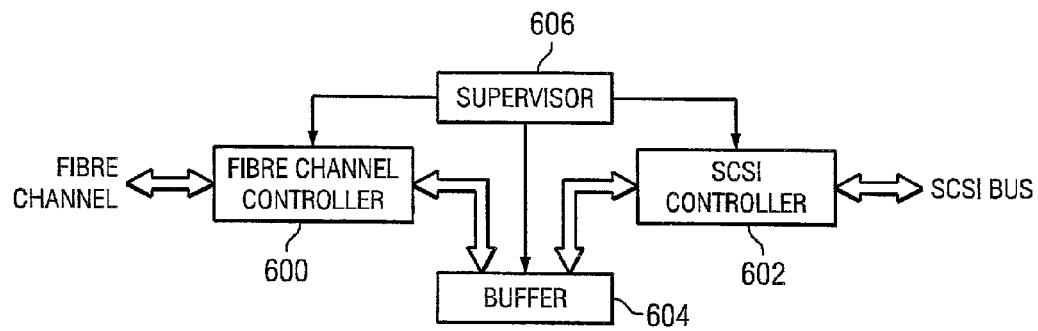
FIG. 6 is a diagrammatic representation of an embodiment of a storage router that can control access to a media library.

FIG. 6 is a diagrammatic representation of one embodiment of storage router which can control access to a media library. The storage router can comprise a first transport medium controller 600 that interfaces with a first transport medium and a second transport medium controller 602 that interfaces with a second transport medium. In one embodiment of the present invention, the first transport medium can be a Fibre Channel transport medium, the second transport medium a SCSI bus, controller 600 a Fibre Channel controller and controller 602 a SCSI controller. In other embodiments of the present invention the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and SATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and SATA; SATA and Fibre Channel; Fibre Channel and Serial SCSI Architecture; Serial SCSI Architecture and Fibre Channel; Infiniband and Serial Attached SCSI; Serial Attached SCSI and Infiniband. Moreover, the transport media can operate according to other protocols.

A buffer 604 provides memory work space and is connected to both Fibre Channel controller 600 and SCSI controller 602. A supervisor unit 606 is connected to Fibre Channel controller 600, SCSI controller 602 and buffer 604. Supervisor unit 606 comprises a microprocessor for controlling operation of the storage router, handling mapping and performing other functions.

Figure 7:
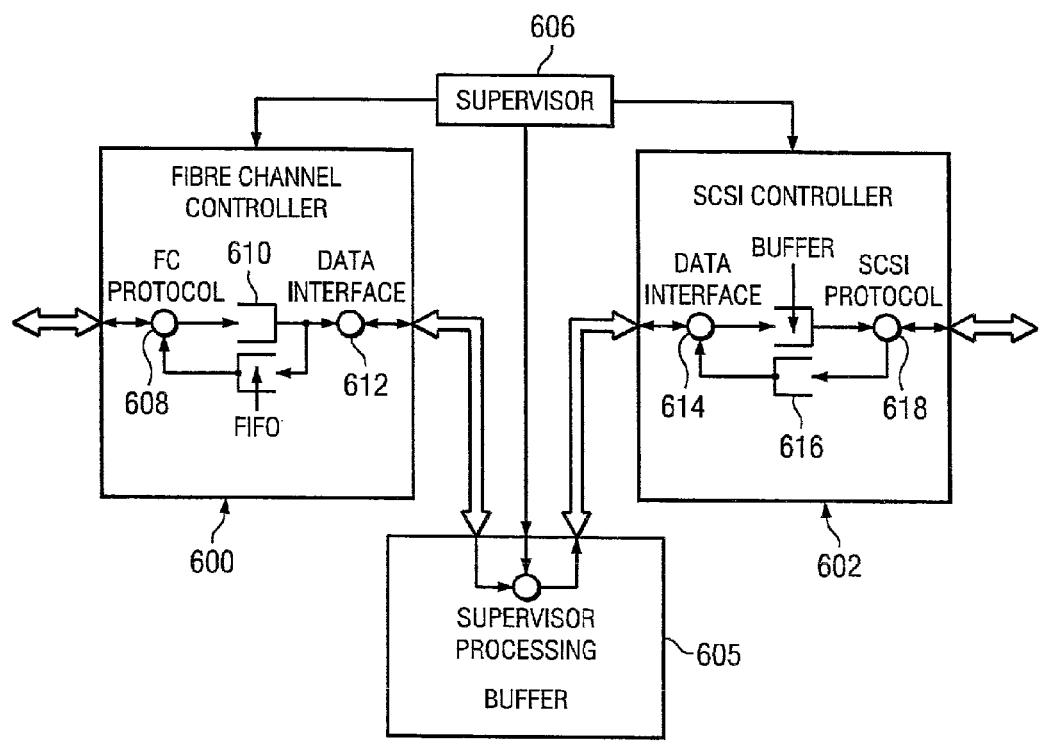
FIG. 7 is a block diagram of one embodiment of a data flow.

FIG. 7 is a block diagram of one embodiment of data flow within the storage router of FIG. 6. As shown, data from the first transport medium (e.g., the Fibre Channel transport medium) is processed by a protocol unit 608 (e.g., a Fibre Channel protocol unit) and placed in a FIFO queue 610. A direct memory access (DMA) interface 612 then takes data out of FIFO queue 610 and places it in buffer 604.

Supervisor unit 606 processes the data in buffer 604 as represented by supervisor processing 605. This processing can include mapping between the first transport medium and the second transport medium, applying access controls and routing functions. For example, supervisor unit 606 can map between Fibre Channel and SCSI, Fibre Channel and Fibre Channel, Fibre Channel and iSCSI or other protocols. A DMA interface 614 then pulls data from buffer 604 and places it into a buffer 616. A second protocol unit 618 pulls data from buffer 616 and communicates the data on the second transport medium (e.g., the SCSI bus). Data flow in the reverse direction, from the second transport medium to the first transport medium, is accomplished in a reverse manner.

In the example of FIGS. 6 and 7, the storage router can be a Fibre Channel to SCSI storage router that can act as a bridge device that connects a Fibre Channel link directly to a SCSI bus and enables the exchange of SCSI command set information between application clients on SCSI bus devices and the Fibre Channel links. Further, the storage router applies access controls such that virtual local storage can be established in remote SCSI storage devices for workstations on the Fibre Channel link. In one embodiment, the storage router provides a connection for Fibre Channel links running the SCSI Fibre Channel Protocol (FCP) to data transport elements or media changers on the SCSI bus. The Fibre Channel topology is typically an Arbitrated Loop (FC_AL).

The storage router can be attached to a Fibre Channel Arbitrated Loop and a SCSI bus to support a number of SCSI devices. Using configuration settings, the storage router can make the SCSI bus devices available on the Fibre Channel network as FCP logical units. Once the configuration is defined, operation of the storage router can be transparent to application clients.

In one implementation (not shown), the storage router can be a rack mount or free standing device with an internal power supply. The storage router can have a Fibre Channel and SCSI port, and a standard, detachable power cord can be used, the FC connector can be an optical Small Form Factor (SFF) connector, and the SCSI connector can be a VHDCI type. Additional modular jacks can be provided for a serial port and a 802.3 10BaseT port, i.e. twisted pair Ethernet, for management access. The SCSI port of the storage router can support SCSI direct and sequential access target devices and can support SCSI initiators, as well. The Fibre Channel port can interface to SCSI-3 FCP enabled devices and initiators or other Fibre Channel devices.

To accomplish its functionality, one implementation of the storage router uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVERS SYSTEMS VXWORKS kernel. In addition, the storage router includes software as required to control functions of the various elements, execute the extended copy command, generate commands and provide appropriate translations between the FC and SCSI protocols.

The present invention, thus, provides a system and method for distributed partitioned library mapping. According to one embodiment, the present invention can include a first controller connected to a data transport element of a media library and a second controller connected to a media changer of the media library. The first controller can maintain a media library partition representing a portion of the media library, receive a command from a host application based on the media library partition and forward the command to the second controller. The first controller can further translate logical addresses referenced in the command to physical addresses before forwarding the command to the second controller. The second controller can receive the command from the first controller and forward the command to the media changer. The second controller, according to another embodiment of the present invention, can also prioritize the command on a FIFO basis or according to other prioritization scheme known in the art.

Another embodiment of the present invention can include a plurality of storage routers. Each storage router from the plurality of storage routers can be connected to a data transport element of a media library and can be configured to maintain at least one media library partition, receive commands directed to a media changer based on the at least one media library partition, forward the command to another storage router. This embodiment of the present invention can also include an additional storage router connected to the media changer of the media library and each of the plurality of storage routers. The additional storage router can be configured to receive forwarded commands directed to the media changer from each of the plurality of storage routers and communicate the forwarded commands to the media changer.

Yet another embodiment of the present invention can include a method comprising maintaining a media library partition at a first controller, receiving a command directed to a media changer at a first controller based on the media library partition, forwarding the command from the first controller to a second controller; and forwarding the command from the second controller to the media changer. This embodiment of the present invention can further include translating logical addresses to physical addresses at the first controller and prioritizing commands at the second controller.

Yet another embodiment of the present includes a computer program device for distributed media library mapping comprising a set of software instructions stored on one or more computer readable media, wherein the software instructions are executable by one or more processors to maintain a media library partition at a first controller, receive a command based on the media library partition, wherein the command is directed to a media changer, translate logical addresses in the command to physical addresses and forward the command to a second controller.

Another embodiment of the present invention includes system comprising a media library that has a plurality of data transport elements and a media changer; a plurality of storage area networks; and a plurality of storage routers. Each of the plurality of storage routers can be connected to a storage area network from the plurality of storage area networks, a data transport element from the plurality of data transport elements and a control network. Moreover, each of the plurality of storage routers can be configured to maintain a library partition representing a portion of the media library, receive a command directed to the media changer based on the library partition via the storage area network; translate logical addresses in the command to physical addresses; and forward the command to another storage router via the control network. Additionally, the system can include an additional storage router connected to the control network and connected to the media changer. The additional storage router can be configured to receive commands via the control network from the plurality of storage routers directed to the media changer and forward the commands to the media changer on a FIFO basis.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A system of distributed partitioned library mapping, comprising:
    a plurality of controllers configured to establish a plurality of media library partitions, wherein the plurality of controllers are configured to:
        receive a plurality of commands from a plurality of host applications based on the plurality of media library partitions, wherein each of the plurality of commands comprises a respective logical address;
        map the each respective logical address to a corresponding physical address based on the one of the media library partitions;
        forward the plurality of commands, each with a respective corresponding physical address, to one of the plurality of controllers, wherein the one of the plurality of controllers is configured to forward the plurality of commands to a media changer.

2. The system of claim 1,
wherein each media library partition represents a portion of a media library.

3. The system of claim 2,
wherein the media changer is configured to access the media library using the corresponding physical address.

4. The system of claim 1,
wherein the one of the plurality of controllers prioritizes the plurality of commands using one or more of:
a FIFO basis; or
other prioritization scheme.

5. The system of claim 1,
wherein a plurality of hosts are configured to execute the plurality of host applications.

6. The system of claim 5,
wherein the plurality of controllers are connected to the plurality of hosts by a first data transport medium; and
wherein the plurality of controllers are further connected to a data transport element of a media library by a second data transport medium.

7. The system of claim 6,
wherein the first data transport medium operates according to one of:
a fibre channel protocol; or
an iSCSI protocol.

8. The system of claim 6, wherein the plurality of controllers are connected to each other via a third data transport medium.

9. The system of claim 1,
wherein a second of the plurality of controllers is configured to execute a configuration application to create the plurality of media library partitions;
wherein the second of the plurality of controllers is further configured to communicate the plurality of media library partitions to each of the plurality of controllers.

10. The system of claim 9,
wherein the configuration application is configured to receive partitioning configuration information; and
wherein the configuration application is further configured to create the plurality of media library partitions at least in part based on the received partitioning configuration information.

11. A system of distributed partitioned library mapping, comprising:
    a plurality of controllers configured to establish a plurality of media library partitions, wherein each of the plurality of controllers is operable to:
        receive a command from a host application, wherein the command is based on one of the plurality of media library partitions, wherein the command comprises a logical address;
        map the logical address in the command to a corresponding physical address based on the one of the media library partitions;
        forward the command with the corresponding physical address to one of the plurality of controllers, wherein the one of the plurality of controllers is configured to forward the command to a media changer.

12. The system of claim 11,
wherein each media library partition represents a portion of a media library; and wherein the media changer is configured to access the media library using the corresponding physical address.

13. The system of claim 11,
wherein the one of the plurality of controllers prioritizes the command using one or more of:
a FIFO basis; or
other prioritization scheme.

14. The system of claim 11,
wherein the plurality of controllers are connected to one or more hosts executing the host application by a first data transport medium; and
wherein the plurality of controllers are further connected to a data transport element of a media library by a second data transport medium.

15. The system of claim 14,
wherein the first data transport medium operates according to one of:
a fibre channel protocol; or
an iSCSI protocol.

16. The system of claim 11,
wherein a second of the plurality of controllers is configured to execute a configuration application to create the plurality of media library partitions;
wherein the second of the plurality of controllers is further configured to communicate the plurality of media library partitions to each of the plurality of controllers.

17. A method of distributed partitioned library mapping comprising:
maintaining a plurality of media library partitions at a plurality of controllers;
receiving one or more commands directed to a media changer at the plurality of controllers based on the plurality of media library partitions;
forwarding the one or more commands from the plurality of controllers to one of the plurality of controllers; and
forwarding the one or more commands from the one of the plurality of controllers to the media changer.

18. The method of claim 17,
wherein the plurality of controllers are connected to one or more hosts executing the host application by a first data transport medium; and
wherein the plurality of controllers are further connected to a data transport element of a media library by a second data transport medium.

19. The method of claim 18,
wherein the first data transport medium operates according to one of:
a fibre channel protocol; or
an iSCSI protocol.

20. The method of claim 17,
wherein a second of the plurality of controllers is configured to execute a configuration application to create the plurality of media library partitions;
wherein the second of the plurality of controllers is further configured to communicate the plurality of media library partitions to each of the plurality of controllers.

* * * * *